June 26, 1962 L. K. HEINRICH 3,040,533
HYDRAULIC PRESSURE EQUALIZING SYSTEM
Filed Feb. 25, 1960
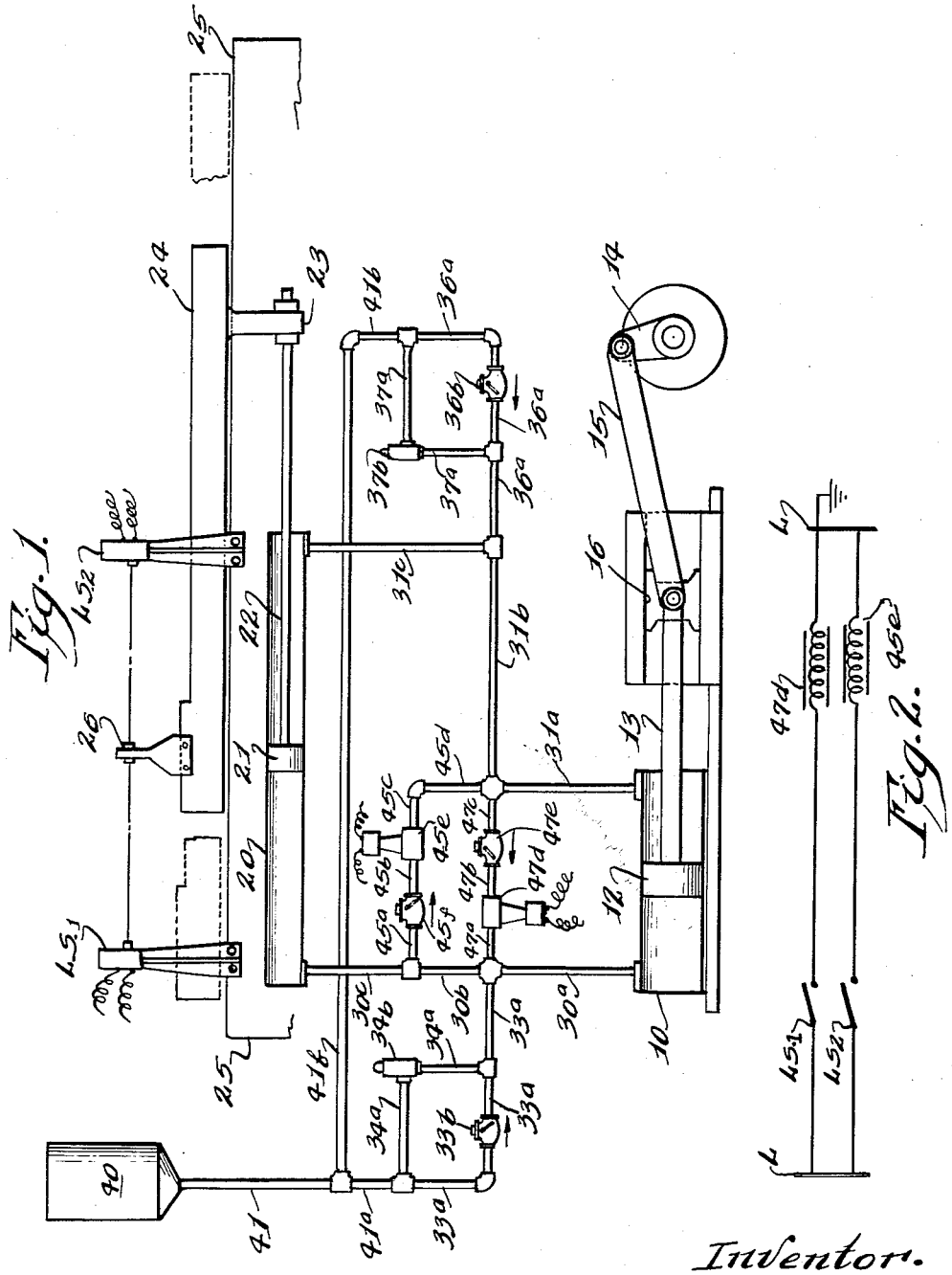
Inventor:
Ludwig K. Heinrich
By James W Grace
Attorney.

United States Patent Office

3,040,533
Patented June 26, 1962

3,040,533
HYDRAULIC PRESSURE EQUALIZING SYSTEM
Ludwig K. Heinrich, Chesterton, Ind., assignor to The Celotex Corporation, Chicago, Ill., a corporation of Delaware
Filed Feb. 25, 1960, Ser. No. 11,095
5 Claims. (Cl. 60—54.5)

This invention is with respect to an improvement in what is otherwise a conventional hydraulic or fluid drive mechanism.

The problem is that of actuating a saw table or the like with harmonic reciprocating motion accomplished by means of a crank arm and cross head imparting reciprocating motion to a master fluid cylinder which is connected by suitable fluid lines to a slave cylinder, the piston of which, through its connecting rod connected to the saw table or the like, imparts the desired reciprocating motion to the saw table. The basic system just described, of course, is normally provided with suitable provision for fluid make-up in case of leakage or the like and which, normally, includes suitably positioned check valves and pressure relief valves whereby any deficiency of hydraulic fluid in either end of the system is automatically replaced or made up, and any abnormal pressure which may be developed is relieved through actuation of pressure relief valves.

Seemingly, regardless of the degree of accuracy of the cylinders, pistons and the like, there is some leakage of hydraulic fluid from one side of such a system to the other side, whereby eventually abnormal pressures are developed in one side of the system or the other and fluid is released through the pressure relief valves. Depending on circumstances, such a system from time to time will operate with some degree of jerkiness or may fail to complete a stroke, and it is for the purpose of avoiding such happenings that the inventions hereof have been developed.

By a relatively simple addition to the basic hydraulic system the difficulties referred to are avoided and provision is made for a smooth transfer of any excess of hydraulic fluid which may be in one side of the system to the other side of the system without the necessity of spilling fluid from the pressure relief valves and which, accordingly, avoids the necessity of taking into the system make-up fluid equivalent to that lost by such spilling previously referred to above.

The principal object of this invention is the provision in a hydraulic actuating system of suitably controlled by-passes from one side of the system to the other to effect a smooth transfer of any excess fluid which is in one side of the system to the other side, in which, in such circumstance, there will exist a deficiency of the fluid. Other objectives such as simplified maintenance and more uniform drive will be apparent on reading the following specification when considered in connection with the accompanying drawings.

In the accompanying drawings, FIGURE 1 is a diagrammatic illustration of the hydraulic actuating system; and FIGURE 2 is a schematic illustration of the wiring diagram thereof.

In the drawings there is shown a master cylinder 10 in which there operates a piston 12 with its associated piston rod 13 reciprocated from a cross head 16 to which a slightly distorted harmonic reciprocation is imparted by connecting rod 15 and crank 14. Associated with the master cylinder 10 there is shown slave cylinder 20 in which operates piston 21 with its connected piston rod 22 which, at 23, is connected to a saw table or the like 24 which is to be driven. Saw table 24 is mounted on a bed member 25 which is but fragmentarily indicated.

Mounted on bed member 25 by means of suitable brackets there are provided limit switches, normally open (NO), LS1 at one end of the desired travel of saw table 24, and a second such mounted limit switch, normally open (NO), LS2 mounted at the other end of the travel of table 24.

Mounted on saw table 24 there is provided on a suitable bracket a contact arm 26 which comprises a switch actuator actuating the limit switches, referred to in the foregoing, when the table 24 reaches the respective ends of its travel.

Suitable pipes or conduits connect master cylinder 10 and slave cylinder 20, this being for one side of the system piping 30a, b, and c, and for the other side of the system, piping 31a, b, and c.

For each side of the fluid circuit there is provided means for the normal fluid makeup or addition, in case of any deficiency of fluid in the circuit, and provision for relief in the event of abnormal pressure being developed in some manner. Such provision of fluid makeup and relief in the system hereof is more precautionary than necessary, but it is deemed advisable that such be included. The makeup circuit for one side of the system comprises piping 33a and check valve 33b, whereas for the other side of the system such comprises pipes 36a and check valve 36b. The pressure relief by-pass associated with the makeup circuit 33 comprises the piping 34a and pressure relief valve 34b, whereas for the makeup circuit 36 such comprises the piping 37a and pressure relief valve 37b.

Associated with and suitably connected to the above described makeup and relief circuits there is provided a fluid tank 40 connected by piping 41 and branches 41a and 41b, respectively, connecting to the makeup and relief circuits at the respective ends of the fluid system.

Since the various paths and circuits of the fluid makeup and pressure relief for the respective ends of the hydraulic system are clearly evident on inspection of the drawing, it is deemed that a detailed description of the circuits is unnecessary, and any attempt to so describe these circuits would but encumber this description.

To the basic hydraulic system above described there has been added suitably controlled by-passes connecting the respective sides of the system whereby, when due to leakage or other circumstance there is an excess of hydraulic fluid in one side or the other of the system, such excess is automatically transferred from the side in which the excess exists to the other side in which there is a corresponding deficiency of fluid. Of course, it could happen that one side or the other of the system might accumulate or receive an excess of fluid without the other side of the system having at the same time a deficiency of fluid. In such case, of course, since there is no deficiency of fluid to be offset, then this by-pass transfer would be rendered ineffective, and the appropriate pressure relief valve 34b or 37b, as might be required, would provide for the release or spill of the excess fluid from the system. This circumstance, as just referred to, is very unlikely to occur, but since there is a possibility thereof the provision for correction has been referred to. The normal variation in the system, however, arises from leakage from one side of the pistons to the other, tending to cause a build-up of fluid in one side or the other of the system. Additionally, however, since it is almost impossible to exactly balance the volumes on their respective sides of the pistons, it ordinarily results that the usual variation tends, over a period, to build-up an excess of fluid in one side or the other of the system. It is for the purpose of counteracting any such build-up of excess fluid in one side of the system or the other that the by-pass systems connecting the two sides have been provided.

The piping of the respective by-pass systems is identified in the drawings as, for the one, 45a, b, c and d, and for the other, 47a, b, and c. In the by-pass system 45 there is provided a solenoid valve 45e and check valve 45f, and in the by-pass system 47 there is provided a solenoid valve 47d and check valve 47e.

Solenoid valves 45e and 47d are both normally closed valves which, when their solenoids are activated, open for the period during which their solenoids are activated.

It is believed that those skilled in the art will readily understand the operation of the apparatus without detailed explanation but, nevertheless, an illustrative example of the operation will be set out below.

Assume the condition, where the piston 12 in master cylinder 10 is moving to the left, that due to some circumstance, leakage past the piston, or the like, there is an excess of fluid in that side of the system ahead of piston 12 and a corresponding deficiency of fluid on the other side of the system behind the piston 12. In such instance piston 21 in the table moving cylinder, the slave cylinder 20, will reach the end of its stroke before piston 12 has moved home, and under ordinary circumstances, without utilization of the inventions hereof, this excess fluid would rapidly build up a high pressure which would waste through pressure relief valve 34b. Utilizing the inventions hereof, however, the situation will be different. As piston 21 arrives at the end of its stroke, the contact arm or switch actuator 26 will have actuated switch LS2, which, as is seen in FIGURE 2, will activate the solenoid of valve 45e opening the valve. The result of the opening of this valve will be to open a passage from the side of excess fluid in the system to the side of fluid deficiency, that is, from the side ahead of the piston to the side behind the piston, and this excess fluid will flow through conduit 45a, check valve 45f, conduit 45b, solenoid valve 45e, conduits 45c, and d, into the side of fluid deficiency, or to the side of the system behind the piston. As a consequence, piston 12 can move home to the end of its stroke without building up the excess pressure which otherwise would have wasted fluid through relief valve 34b. It is, of course, readily apparent that not only does the invention hereof avoid the wastage of fluid through discharge from the relief valve, but it has the advantage instead of transferring the excess fluid of the one side of the system to the other side of the system wherein there is a deficiency of fluid, so that the fluid in the two sides of the system is constantly being balanced.

Taking another condition wherein the piston 12 is moved to the left but where there is an excess volume of fluid in the other side behind the piston, with a deficiency on that side of the system ahead of the piston, then the operating condition, it will be understood, is different from that above discussed. In such case there is not enough fluid ahead of the piston to move the carriage operating or slave piston 21 to the end of its stroke, and it follows that the stroke will not be completed and switch actuator 26 will not contact switch LS2. When piston 12 starts on its return stroke, that is, its stroke to the right, then the fact that piston 21 did not reach the end of its stroke to the right creates a condition where piston 21 will move with a lead over piston 12, and this is particularly so due to the fact that, as stated, there is excess fluid in the side of the system now behind piston 21. The result of this will be that piston 21 will reach the end of its stroke before piston 12 reaches the end of its stroke at the right hand end of its cylinder, with the consequence that as piston 21 reaches the end of its stroke, contact arm 26 will contact switch LS1. Again going to FIGURE 2, it will be seen that actuation of switch LS1 will close the circuit and activate solenoid of valve 47d to open this normally closed valve. It will be understood, of course, that this occurs just as piston 12 would have begun to build up a high pressure behind it due to the fact that piston 21 had reached the end of its stroke. Valve 47d, however, having been open, this excess fluid which would have built up the high pressure behind piston 12 will flow through conduit 47c, check valve 47e, conduit 47b, solenoid valve 47d and conduit 47a into the other side of the system to balance the system.

It is believed that it will be readily understood from the foregoing that under all ordinary operating conditions the incorporation of the inventions hereof into the conventional hydraulic actuating system overcomes the deficiencies thereof arising from leakage of fluid from one side of the system to the other, and that under all ordinary operating conditions the inclusion of the inventions hereof serves to maintain a proper balance of fluid in the two sides of the system. Of course, if there is leakage from the system, that is, such as seepage from pipe joints or the like, any deficiency so arising will be made up by fluid supplied from tank 40 through conduits 41, 41a and b, and conduits 33a and 36a through check valves 33b and 36b into the system.

It is believed that with the foregoing description of the inventions hereof it will be apparent to those skilled in the art that there are alternatives of the features herein disclosed which may be substituted but which, so far as I have had opportunity to analyze them, will be somewhat less satisfactory in operation although, generally speaking, accomplishing the same objective. The disclosure hereof teaching the principles of my invention, it is the purpose hereof that such disclosure and the claims hereof based thereon shall be deemed to cover all modifications and variations of the inventions hereof falling within the scope of the disclosure and the appended claims.

The inventions hereof having been disclosed and described in detail, I claim:

1. In an hydraulic fluid pressure system comprising a master cylinder having a first closed end and a second closed end, a master piston mounted in said master cylinder; power means connected to said master piston for imparting reciprocal motion thereto; a slave cylinder having a first closed end and a second closed end; a slave piston mounted in said slave cylinder; a load, means extending through one of said closed ends in sealed relationship thereto and connecting said slave piston and said load; a first fluid conducting means connecting said first ends of said cylinders; a second fluid conducting means connecting said second ends of said cylinders, the improvement comprising a third fluid conducting means connecting said first end of said master cylinder and said second end of said slave cylinder, said third fluid conducting means including a normally closed valve; a fourth fluid conducting means connecting said second end of said master cylinder and said first end of said slave cylinder, said fourth fluid conducting means including a normally closed valve, a separate energizing circuit for each of said normally closed valves, each of said energizing circuits including a source of electric power and a switch means, and means connected to said load and adapted to actuate one of said switch means for opening one of said valves whenever said load reaches a first predetermined position and adapted to actuate the other of said switch means for opening the other of said valves whenever said load reaches a second predetermined position, whereby upon the opening of either of said valves, hydraulic pressure between said slave piston and one of said closed ends of said slave cylinder is relieved by flow of hydraulic fluid to said master cylinder.

2. An hydraulic pressure equalizing system as recited in claim 1 in which said third and fourth fluid conducting means each further includes a one-way valve for controlling the direction of fluid flow therethrough.

3. In a saw table actuating apparatus having a predetermined length of stroke including a saw table adapted to be moved continuously in a reciprocating motion, a slave cylinder having closed ends, a piston enclosed in said slave cylinder for reciprocating movement therein between said closed ends, means extending through one of said closed ends in sealed relationship thereto and connecting said piston to said table for moving said table in reciprocating motion, a master cylinder having closed ends, a piston enclosed in said master cylinder for reciprocating movement therein between said closed ends, means connected to said piston in said master cylinder for producing said continuous reciprocating motion of said last mentioned piston, fluid conducting means connecting corresponding ends of said slave and said master cylinders for imparting reciprocating movement of said piston of said master cylinder to said piston of said slave cylinder, the improvement comprising fluid relief means connecting opposite ends of said slave and master cylinders for relief of any fluid pressure developed between one of said pistons and one of said closed ends of its respective enclosing cylinder which prevents said saw table from completing its predetermined length of stroke, and control means operatively connected to said saw table for controlling actuation of said fluid relief means.

4. The improved saw table apparatus recited in claim 3, in which said fluid relief means comprises a pair of parallel fluid conductors, each conductor including a one-way check valve for control of the direction of motion of the fluid to relieve any fluid pressure developed between one of said pistons and one of the said closed ends of its respective enclosing cylinder which prevents said saw table from completing its predetermined length of stroke.

5. The improved saw table apparatus recited in claim 3 in which said fluid relief means comprises a pair of parallel fluid conductors, each conductor including a one-way check valve and a solenoid operated valve, and said fluid relief means controlling means comprising a pair of microswitches each operatively connected to said saw table and each connected in series with a respective one of said solenoid operated valves for controlling the direction of motion of the fluid to relieve any fluid pressure developed between said slave pistons and one of said closed ends of said slave cylinder which prevents said saw table from completing its predetermined length of stroke.

References Cited in the file of this patent

UNITED STATES PATENTS

| 1,055,238 | Silander | Mar. 4, 1913 |
| 1,802,790 | Squires | Apr. 28, 1931 |
| 2,227,279 | Smith | Dec. 31, 1940 |
| 2,243,716 | Monroe | May 27, 1941 |
| 2,417,232 | Bohall et al. | Mar. 11, 1947 |
| 2,420,406 | Andrews et al. | May 13, 1947 |

FOREIGN PATENTS

| 888,687 | France | Sept. 13, 1943 |
| 1,187,440 | France | Mar. 2, 1959 |
| 500,673 | Great Britain | Feb. 14, 1939 |